United States Patent
Angerer et al.

(10) Patent No.: US 10,814,747 B2
(45) Date of Patent: Oct. 27, 2020

(54) SPINDLE DRIVE, METHOD FOR PRODUCING A SPINDLE DRIVE, AND COMFORT DRIVE

(71) Applicant: Robert Bosch GmbH, Stuttgart (DE)

(72) Inventors: Christof Angerer, Lauf (DE); Enrique Adame Ramirez Raul, Ottersweier (DE); Gilles Peter, Morsbronn les Bains (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/356,934

(22) Filed: Mar. 18, 2019

(65) Prior Publication Data

US 2019/0291604 A1 Sep. 26, 2019

(30) Foreign Application Priority Data

Mar. 20, 2018 (DE) .................. 10 2018 204 263

(51) Int. Cl.
*B60N 2/00* (2006.01)
*B60N 2/06* (2006.01)
*F16H 1/16* (2006.01)
*B60N 2/02* (2006.01)

(52) U.S. Cl.
CPC ........... *B60N 2/067* (2013.01); *B60N 2/0232* (2013.01); *F16H 1/16* (2013.01); *B60N 2002/0236* (2013.01)

(58) Field of Classification Search
CPC .............. B60N 2/067; B60N 2/0232; B60N 2002/0236; F16H 1/16; F16H 2025/209; F16H 2025/2084; F16H 25/2003; F16H 25/20
See application file for complete search history.

(56) References Cited

U.S. PATENT DOCUMENTS

| 8,113,074 | B2 * | 2/2012 | Wohrle | B60N 2/0232 74/424.74 |
| 2011/0308340 | A1 * | 12/2011 | Bosecker | B60N 2/067 74/89.32 |
| 2013/0327168 | A1 * | 12/2013 | Wu | F16H 25/2015 74/89.37 |
| 2019/0009693 | A1 * | 1/2019 | Angerer | F16H 57/039 |
| 2019/0291603 | A1 * | 9/2019 | Martiny | B60N 2/0232 |
| 2019/0291604 | A1 * | 9/2019 | Angerer | F16H 1/16 |

FOREIGN PATENT DOCUMENTS

| DE | 102006009576 | 9/2007 |
| DE | 102009003280 | 11/2010 |
| DE | 102016203639 | 9/2017 |

* cited by examiner

*Primary Examiner* — Victor L MacArthur
(74) *Attorney, Agent, or Firm* — Michael Best & Friedrich LLP

(57) ABSTRACT

A spindle drive (10), with a spindle (20) which is rotatable about a rotation axis (24) at least indirectly by a drive motor (12), the spindle (20) having a thread-like spindle turn (22) on which a spindle nut (26) is arranged movably in the longitudinal direction of the rotation axis (24), and with a worm gear (15; 15a) which is arranged in a gear housing (14), is drivable by the drive motor (12) and is connected to the spindle (20) for conjoint rotation therewith.

19 Claims, 4 Drawing Sheets

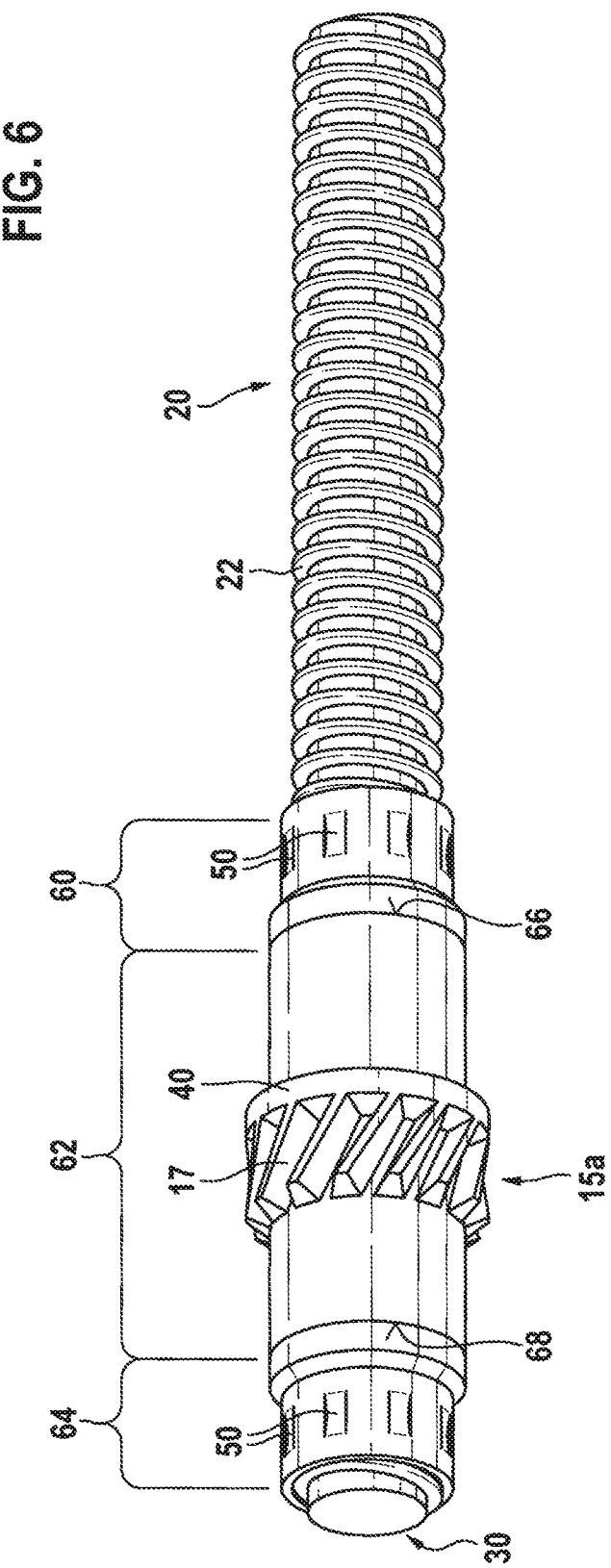

SPINDLE DRIVE, METHOD FOR PRODUCING A SPINDLE DRIVE, AND COMFORT DRIVE

BACKGROUND OF THE INVENTION

The invention relates to a spindle drive. The invention further relates to several methods for producing or assembling a spindle drive, and to a comfort drive, in particular a seat adjustment drive, which has a spindle drive.

DE 10 2016 203 639 A1 from the applicant discloses a spindle drive. The spindle drive, serving as a constituent part of a seat adjustment drive, has a spindle which is rotatable by a drive motor and on which a spindle nut is arranged in a linearly movable manner. When the spindle rotates about its rotation axis, the spindle nut, arranged for conjoint rotation with respect to the rotation axis of the spindle, moves along the spindle and in so doing moves the element (seat) that is to be adjusted. In order to transfer the torque from the drive motor to the spindle, the spindle is connected to a worm gear for conjoint rotation therewith. For this purpose, the spindle undergoes suitable mechanical treatment, in the region in question, in order to form a suitable geometry for transferring the torque, and the worm gear, made of plastic, is injection molded onto the spindle.

Since spindle drives of this kind are usually adapted to a specific vehicle or a specific use, the lengths of the spindles are accordingly also different. The manufacturing process is quite complex, particularly in relation to the mechanical treatment of the spindle that usually has to be undertaken in the injection region of the worm gear. Another point that has to be taken into account is that such a spindle of considerable length is quite difficult to handle in the region of the injection molding tool.

SUMMARY OF THE INVENTION

The spindle drive according to the invention, has the advantage that the connection between the spindle and the worm gear can be configured in an alternative way to the prior art and in a manner that is advantageous in terms of manufacturing technology. In particular, the invention means that the spindle does not have to be mechanically treated, or have its geometry modified, in the region of the worm gear. This makes it possible in particular for a spindle of the required length to be configured and produced by simply cutting off the relevant portion from a spindle bar of greater length. Moreover, the spindle nut can be fitted in place directly on a spindle drive assembly line, and it is therefore not necessary for the (long) spindle to have to be handled at a separate region for injection of the spindle nut.

The underlying concept of the invention is that the worm gear no longer has to be produced by regional encapsulation of the spindle or injection of the plastic of the worm gear onto the spindle, and instead the worm gear is to be formed from at least two elements that can be prefabricated. In analogy to an injection molded worm gear, a first element of the worm gear has the (outer) toothing and is fastened or secured both radially and axially on the spindle turn of the spindle by at least one second element.

The invention allows such a worm gear to be formed either from two elements or alternatively from three elements, in which case the first element is arranged centrally between the two second elements, and the two second elements serve to fix or secure the centrally arranged first element, which has the toothing.

The invention specifically teaches that the worm gear is formed from at least two elements, of which a first element of the worm gear has an outer toothing and in the longitudinal direction of the spindle is connected to the spindle for conjoint rotation therewith, while at least one second element of the worm gear axially braces the first element against the spindle turn of the spindle in the longitudinal direction of the spindle, or the first element of the worm gear is fixed between two second elements of the worm gear, and, irrespective of whether the worm gear is composed of two elements or of three elements, the spindle turn is always formed in the region of the worm gear.

In a preferred design embodiment of the general concept of the invention, provision is made that the at least two elements of the worm gear have an at least substantially sleeve-shaped configuration, and that the first element of the worm gear is made of plastic, and the at least one second element of the worm gear is made of metal. By making the first element of the worm gear from plastic, with its outer toothing operatively connected to the drive motor, it is possible in particular to achieve a low-noise drive. By making the at least one second element of the worm gear from metal, the second element can be fixed on the spindle particularly easily and reliably by regional deformation.

To axially adjust the position of the first element of the worm gear on the end region of the spindle, provision is made that the first element has a geometry, particularly in the form of an internal thread, interacting with the spindle turn of the spindle, in such a way that the first element of the worm gear can be screwed onto the spindle turn of the spindle in the manner of a threaded nut.

To ensure that forces or moments serving to clamp or fix the first element of the worm gear on the spindle turn of the spindle are transferred from the at least one second element of the worm gear, provision is made that the at least one second element of the worm gear has a through-bore, such that the at least one second element of the worm gear can be pushed onto the spindle, in the longitudinal direction of the spindle, with slight radial play, and that the at least one second element of the worm gear has means for producing a clamped and/or force-fit connection to the spindle.

Particularly preferably, the last-mentioned means are formed by at least one deformation portion, preferably a plurality of deformation portions arranged at uniform angle distances about the rotation axis on the at least one second element of the worm gear and deformable against the spindle turn of the spindle.

Furthermore, it is important that, in the case of a two-part design of the worm gear, the two elements are arranged for conjoint rotation with respect to the rotation axis of the spindle by means of a form-fit connection. In this way, the two elements can be fixed or positioned on the spindle at the desired position. This form-fit connection advantageously has projections on one element, which projections are arranged parallel to the rotation axis of the spindle and engage in diametrically opposite recesses of the other element.

The invention also comprises methods for producing an above-described spindle drive, and, in the case of a worm gear having two elements, the method is characterized by at least the following steps:

the spindle with the spindle turn is cut to a desired length or produced with a desired length, the first element of the worm gear is mounted on the spindle turn of the spindle at a desired axial position on the spindle, in particular at an end region of the spindle, the second element of the worm gear is mounted on the spindle, with the second element axially bracing the first element against the spindle turn of the spindle, the second element is secured on the spindle.

By contrast, if use if made of a worm gear with three (sleeve-shaped) elements, there are two advantageous methods for its production and assembly. In a first variant, this method is characterized by at least the following steps:

the spindle with the spindle turn is cut to a desired length or produced with a desired length, a first second element of the worm gear is mounted on the spindle, the first second element of the worm gear is secured on the spindle, the first element of the worm gear is mounted at a desired axial position on the spindle, in particular at an end region of the spindle, with the first element being brought into axial bearing contact with the first second element, a second element of the worm gear is mounted on the spindle so as to bear axially on the first element of the worm gear, the second element of the worm gear is secured on the spindle.

Alternatively to this, the method can have at least the following steps:

the spindle with the spindle turn is cut to a desired length or produced with a desired length, the first element of the worm gear is mounted at a desired axial position on the spindle, in particular at an end region of the spindle, a first second element of the worm gear is mounted on the spindle, the first second element is secured on the spindle, the first second element being brought into axial bearing contact with the first element, a second second element of the worm gear is mounted on the spindle so as to bear axially on the first element of the worm gear, the second second element of the worm gear is secured on the spindle.

In a preferred development of the above-described methods, provision is made that the at least one second element is secured on the spindle by regional deformation of the second element.

Lastly, the invention also comprises a comfort drive, in particular a seat adjustment drive or a steering wheel adjustment drive, having a spindle drive according to the invention.

BRIEF DESCRIPTION OF THE DRAWINGS

Further advantages, features and details of the invention will become clear from the following description of preferred embodiments and by reference to the drawing, in which:

FIG. 6 shows the axial end region of a spindle in a modified embodiment of the worm gear.

Identical elements or elements with an identical function are provided with the same reference numerals in the figures.

DETAILED DESCRIPTION

Figure 1:
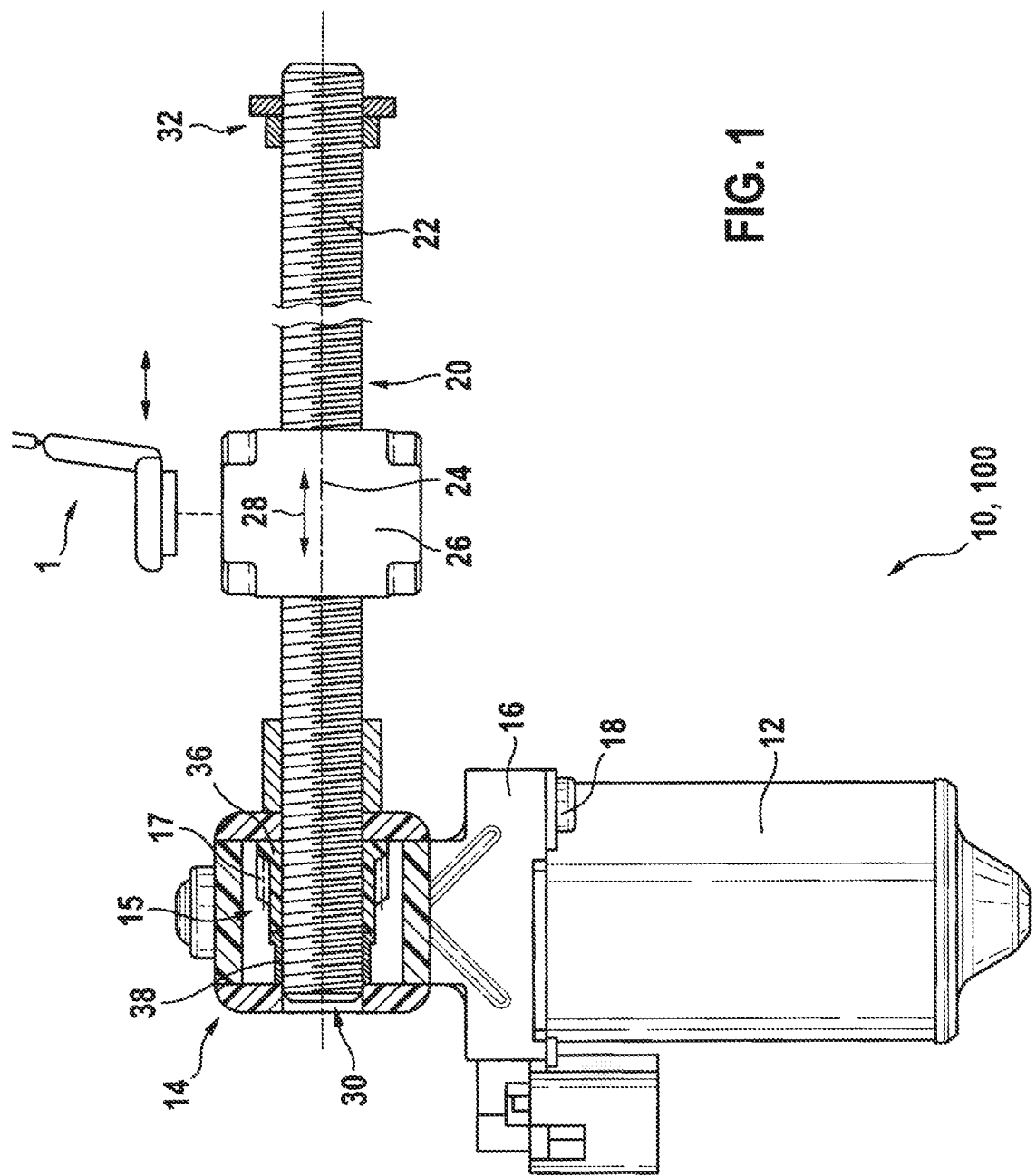
FIG. 1 shows a simplified, partially sectioned side view of a spindle drive configured in the form of a seat adjustment drive.

FIG. 1 shows the main constituent parts of a spindle drive 10 as a constituent part of a comfort drive 100 for adjusting a seat 1 in a vehicle. The spindle drive 10 comprises a drive motor 12 which is configured as an electric motor and which is secured on a gear housing 14, in the region of an attachment flange 16 of the gear housing 14, by means of fastening screws 18. A worm gear 15 (shown in a simplified form in FIG. 1) with an outer toothing 17 is arranged inside the gear housing 14. The worm gear 15 is driven or rotated by the drive motor 12 via the outer toothing 17.

At an end region 30 of a spindle 20, the worm gear 15 is connected to the latter for conjoint rotation therewith, wherein the end region 30 protrudes into the gear housing 14 or is arranged in the gear housing 14. Moreover, the worm gear 15 is arranged free of axial play inside the gear housing 14, for which purpose further components such as thrust washers, shaft springs or the like (not shown in FIG. 1) can be used, as is known per se from the prior art.

The spindle 20 has a thread-like spindle turn 22 on its outer circumference and is rotatable in both directions, depending on the direction of rotation of the drive motor 12, about a rotation axis 24 which is identical to the longitudinal axis of the spindle 20. Outside the gear housing 14, a spindle nut 26 is arranged on the spindle 20 or the spindle turn 22 and is arranged for conjoint rotation with respect to the rotation axis 24, such that, during a rotation of the spindle 20 about the rotation axis 24, the spindle nut 26 connected to the seat 1 in a manner not shown in detail is moved in the longitudinal direction of the spindle 20, i.e. in the direction of the double arrow 28, in order thereby to adjust the seat 1 in the desired manner.

In order to limit the axial adjustment travel of the spindle nut 26 in the direction away from the gear housing 14, a two-part end stop 32 is arranged at the other axial end of the spindle 20.

Figure 2:
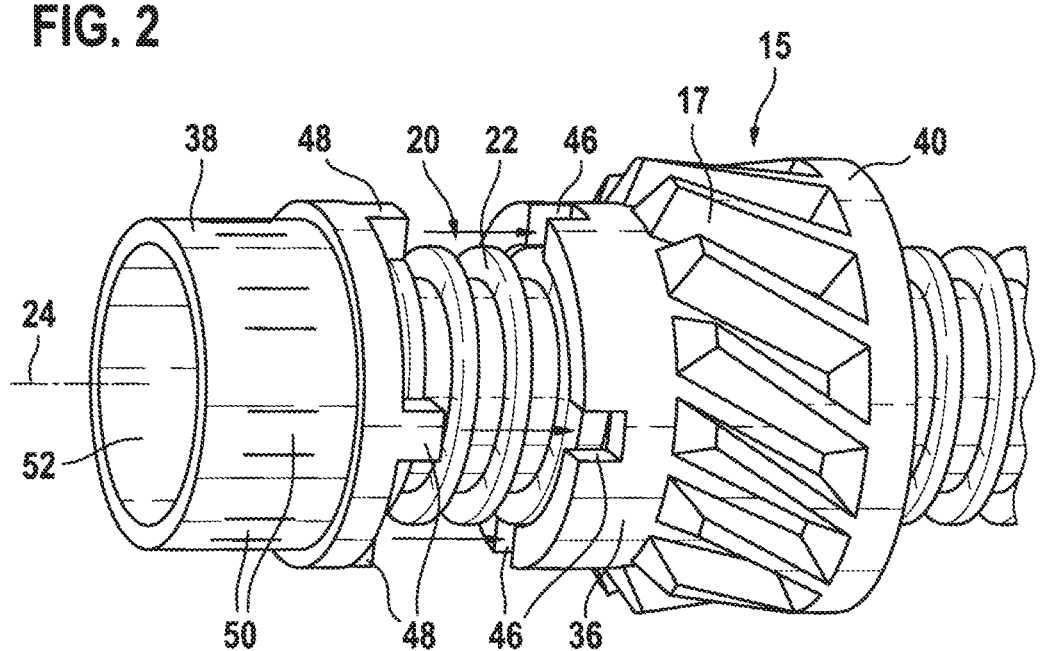
FIGS. 2 and 3 each show a perspective view of an axial end region of a spindle of the spindle drive from FIG. 1, in order to explain the process of assembling a worm gear.
Figure 3:
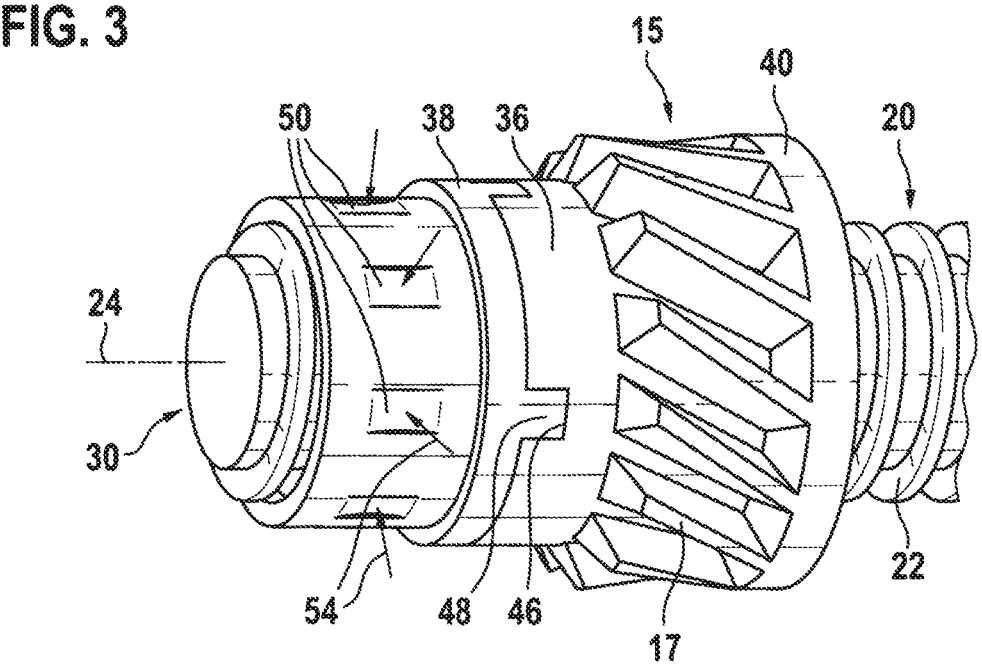

In a first embodiment of the worm gear 15, the latter is composed, according to FIGS. 2 and 3, of two separate elements 36, 38 that interact with each other. While one element 36, having the outer toothing 17, is produced by injection molding and made of plastic, the other element 38 is made of metal. The two elements 36, 38 have a substantially sleeve-shaped configuration. The first element 36, which faces toward the spindle nut 26, has for example, on the side facing the spindle nut 26, a portion 40 of enlarged diameter extending radially about the rotation axis 24 and comprising the outer toothing 17.

Figure 4:
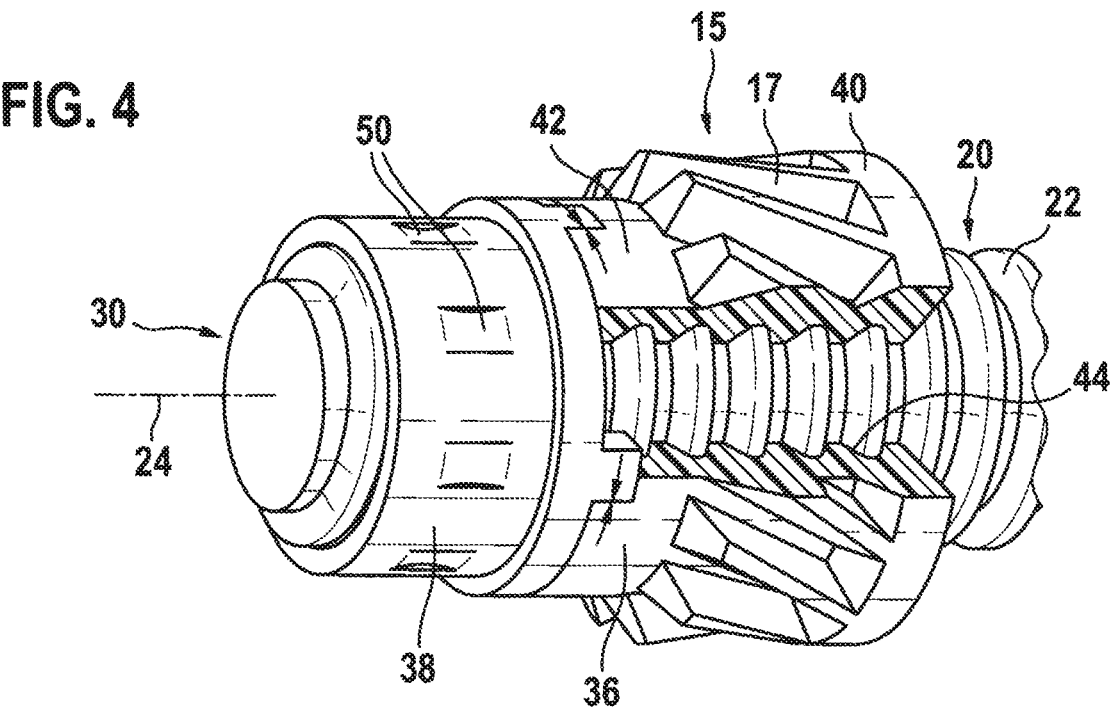
FIGS. 4 and 5 each show a partially sectioned, perspective view of the assembled worm gear according to FIG. 3, in order to illustrate the forces that lock the worm gear.
Figure 5:
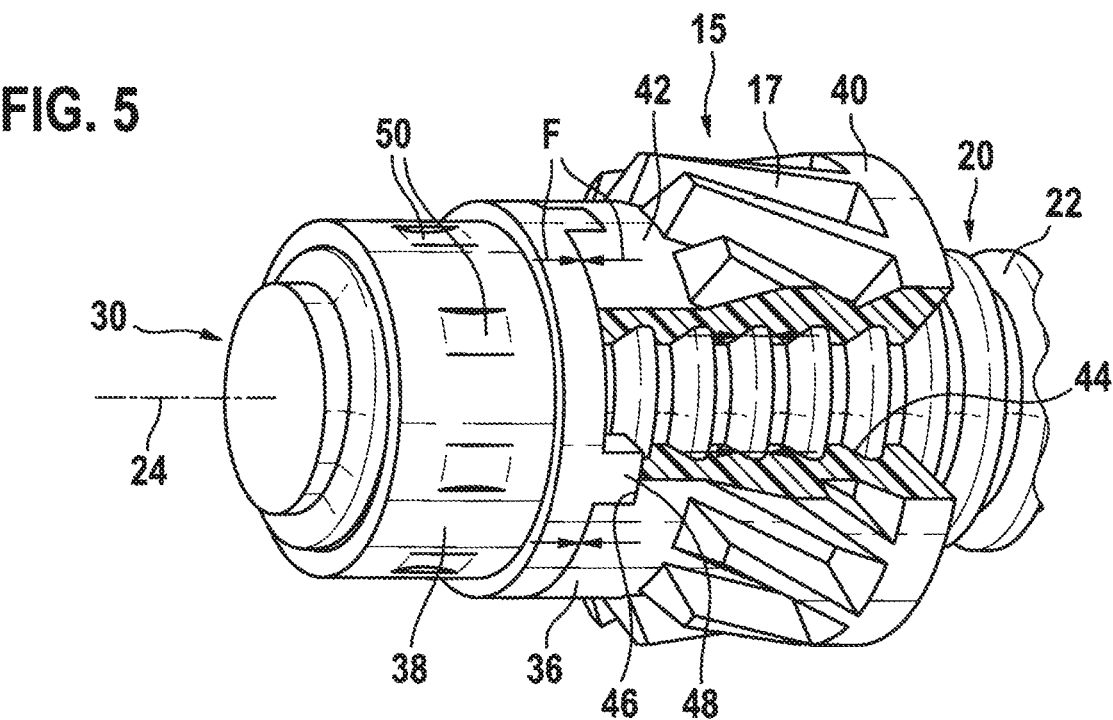

As can be seen in particular from FIGS. 4 and 5, the first element 36 additionally has in its sleeve-shaped portion 42 an inner bore with an internal geometry 44 in the form of a thread turn, which interacts with the geometry of the spindle turn 22 in such a way that, during a rotation of the first element 36 about the rotation axis 24, the first element 36 can be screwed onto the end region 30 of the spindle 20. Moreover, on the side facing away from the spindle nut 26, the first element 36 has for example a plurality of recesses 46, for example of approximately rectangular shape, which are arranged at uniform angle distances about the rotation axis 24 and parallel to the rotation axis 24.

The second element 38 of the worm gear 15 likewise has a substantially sleeve-shaped configuration and, on the side facing toward the first element 36, has opposite projections 48 which interact with the recesses 46, such that, when the projections 48 engage in the recesses 46, the two elements 36, 38 are arranged relative to each other to permit conjoint rotation about the rotation axis 24. Moreover, a plurality of deformation portions 50, likewise preferably arranged at uniform angle distances about the rotation axis 24, are provided in a portion of the second element 38 located approximately centrally with respect to the axial extent.

The second element 38 preferably has an inner bore 52, of which the diameter is at most slightly greater than the external diameter of the spindle 20, such that the second element 38 can be pushed in the longitudinal direction onto the end region 30 of the spindle 20 in a manner at least almost free of radial play.

The two elements 36, 38 for forming the worm gear 15 are secured in the manner explained below with reference to the sequence of FIGS. 2 and 3. First of all, in a first step according to the view in FIG. 2, the first element 36 is moved to the desired axial position by being screwed onto the end region 30 of the spindle 20. The second element 38 is then pushed over the end region 30 of the spindle 20 in such a way that the projections 48 engage in the recesses 46. This state is shown in FIG. 3. Then, by application of radial forces according to the arrows 54, the deformation regions 50 on the second element 38 are deformed radially inwardly, in such a way that the second element 38 is secured on the end region 30 of the spindle 20 for conjoint rotation therewith about the rotation axis 24. Since the second element 38 is pressed with an axial bearing force against the first element 36 before the deformation regions 50 are pressed or deformed, the first element 36 is at the same time axially braced against the spindle turn 22 of the spindle 20 in the region of the internal thread 44.

FIG. 4 shows that the interaction of the projections 48 and of the recesses 46 as a form-fit connection has the effect that the second element 38 is arranged in the radial direction for conjoint rotation with the first element 36. FIG. 5 shows that a direct bearing contact between the elements 36, 38 exists as a result of the axial force F between the end faces of the two elements 36, 38, while at the same time the first element 36 is braced axially by the second element 38 toward the spindle nut 26, wherein the internal thread 44 bears with frictional engagement on the spindle turn 22 of the spindle 20. Thus, with respect to the spindle 20, the worm gear 15 is connected fixedly to the end region 30 of the spindle 20 both in the radial direction and in the axial direction.

FIG. 6 shows a modified worm gear 15a at the end region 30 of the spindle 20. The worm gear 15a is composed of three adjoining sleeve-shaped elements 60, 62 and 64 viewed in the axial direction of the spindle 20. The (central) element 62 with the outer toothing 17 can be configured corresponding to the element 36 in the worm gear 15, and in particular it can also have an internal geometry in the form of an internal thread. Furthermore, in contrast to the element 36, the (central) element 62 does not have recesses 46 at its two opposite end faces 66, 68. By contrast, the two elements 60, 64 made of metal are configured analogously to the element 38 as an end stop 38, but without projections 48.

To assemble the worm gear 15a, the element 60 for example is first of all pushed onto the spindle 20 and brought to its desired axial position. The deformation portions 50 are then deformed, such that the element 60 is fixed on the spindle 20. Thereafter, the (central) element 62 is rotated onto the spindle 20 as far as the element 60. The element 64 is now mounted on the spindle 20, preferably with application of an axial force to the elements 60 and 62. Lastly, the deformation portions 50 of the element 64 are deformed against the spindle turn 22 of the spindle 20 in order to fix the element 64 on the spindle 20.

The above-described spindle drive 10 can be adapted or modified in a wide variety of ways, without departing from the concept of the invention. Thus, in the case of the worm gear 15 for example, provision may be made that the recesses 46 and projections 48 are arranged on the respective other element 36, 38.

What is claimed is:

1. A spindle drive (10), the spindle drive (10) comprising a spindle (20) which is rotatable about a rotation axis (24) at least indirectly by a drive motor (12), the spindle (20) having threads (22) on which a spindle nut (26) is arranged movably in opposite longitudinal directions of the rotation axis (24), and with a worm gear (15; 15a) which is arranged in a gear housing (14), the worm gear (15; 15a) having an outer toothing (17) that is drivable by the drive motor (12) and being connected to the spindle (20) for conjoint rotation therewith,
wherein the threads (22) engage threads of the worm gear (15; 15a),
wherein the worm gear (15; 15a) is formed from at least first and second elements (36, 38; 60, 62, 64),
wherein the first element (36; 62) of the worm gear (15; 15a) has the outer toothing (17) and is connected to the spindle (20) for conjoint rotation therewith, and
wherein the second element (38; 60, 64) of the worm gear (15) axially engages the first element (36) of the worm gear (15) to prevent movement of the first element (36; 62) relative to the spindle (20) in one of the longitudinal directions of the spindle (20).

2. The spindle drive according to claim 1, wherein the first and second elements (36, 38; 60, 62, 64) of the worm gear (15; 15a) have an at least substantially sleeve-shaped configuration, wherein the first element (36; 62) of the worm gear (15; 15a) is made of plastic, and the second element (38; 60, 64) of the worm gear (15; 15a) is made of metal.

3. The spindle drive according to claim 1, wherein the first and second elements (36, 38) of the worm gear (15) are arranged for conjoint rotation with respect to the rotation axis (24) by means of a form-fit connection formed on the elements (36, 38).

4. The spindle drive according to claim 3, wherein the form-fit connection has axial projections (48) which are arranged parallel to the rotation axis (24) and engage in diametrically opposite recesses (46).

5. A method for producing a spindle drive (10) configured according to claim 1, said method comprising at least the following steps:
the spindle (20) with the threads (22) is cut to a desired length or produced with a desired length,
the first element (36) of the worm gear (15) is mounted on the threads (22) of the spindle (20) at a desired axial position on the spindle (20),
the second element (38) of the worm gear (15) is mounted on the spindle (20), with the second element (38) axially bracing the first element (36) against the threads (22) of the spindle (20), and
the second element (38) is secured on the spindle (20).

6. The method according to claim 5, wherein the second element (38; 60, 64) of the worm gear (15; 15a) is secured on the spindle (20) by regional plastic deformation of the second element (38; 60, 64) of the worm gear (15; 15a).

7. A method for producing a spindle drive (10) configured according to claim 1, said method comprising at least the following steps:

the spindle (20) with the threads (22) is cut to a desired length or produced with a desired length, a first second element (60) of the worm gear (15a) is mounted on the spindle (20), the first second element (60) of the worm gear (15a) is secured on the spindle (20), the first element (62) of the worm gear (15a) is mounted at a desired axial position on the spindle (20), with the first element (62) being brought into axial bearing contact with the first second element (60), a second second element (64) of the worm gear (15a) is mounted on the spindle (20) so as to bear axially on the first element (62) of the worm gear (15a), and the second second element (64) of the worm gear (15a) is secured on the spindle (20).

8. The method according to claim 7, wherein the second element (38; 60, 64) of the worm gear (15; 15a) is secured on the spindle (20) by regional plastic deformation of the second element (38; 60, 64) of the worm gear (15; 15a).

9. A method for producing a spindle drive (10) configured according to claim 1, said method comprising at least the following steps:

the spindle (20) with the threads (22) is cut to a desired length or produced with a desired length, the first element (62) of the worm gear (15a) is mounted at a desired axial position on the spindle (20), a first second element (60) of the worm gear (15a) is mounted on the spindle (20), the first second element (60) is secured on the spindle (20), the first second element (60) being brought into axial bearing contact with the first element (62), a second second element (64) of the worm gear (15a) is mounted on the spindle (20) so as to bear axially on the first element (62) of the worm gear (15a), and the second second element (64) of the worm gear (15a) is secured on the spindle (20).

10. The method according to claim 9, wherein the second element (38; 60, 64) of the worm gear (15; 15a) is secured on the spindle (20) by regional plastic deformation of the second element (38; 60, 64) of the worm gear (15; 15a).

11. A seat adjustment mechanism (100), having a spindle drive (10) according to claim 1.

12. The spindle drive according to claim 1, wherein the second element (38; 60, 64) of the worm gear (15) axially engages the first element (36) to fix the first element (62) for conjoint rotation with the spindle (20).

13. The spindle drive according to claim 1, wherein the first element (62) of the worm gear (15a) is threaded onto the spindle (2) and is fixed between and engages the second element (60, 64) and an additional second element (60, 64) to fix the first element (62) relative to the spindle (20) in both of the longitudinal directions of the spindle (20), thereby preventing rotation of the first element (62) relative to the spindle (20).

14. The spindle drive according to claim 1, wherein the first element (36; 62) of the worm gear (15; 15a) has a geometry (44), in the form of an internal thread, interacting with the threads (22) of the spindle (20), in such a way that the first element (36; 62) of the worm gear (15; 15a) can be screwed onto the threads (22) of the spindle (20).

15. The spindle drive according to claim 1, wherein the second element (38; 60, 64) of the worm gear (15; 15a) has a bore (52), such that the second element (38; 60, 64) of the worm gear (15; 15a) can be pushed onto the spindle (20), in the opposite longitudinal directions of the spindle (20), with radial play, and wherein the second element (38; 60, 64) of the worm gear (15; 15a) has means for producing a clamped and/or force-fit connection to the spindle (20).

16. The spindle drive according to claim 15, wherein the means have a plurality of deformation portions (50) arranged at uniform angle distances about the rotation axis (24) and deformable against the threads (22) of the spindle (20).

17. A spindle drive (10), the spindle drive (10) comprising a spindle (20) which is rotatable about a rotation axis (24) at least indirectly by a drive motor (12), the spindle (20) having threads (22) on which a spindle nut (26) is arranged movably in a longitudinal direction of the rotation axis (24), and with a worm gear (15; 15a) which is arranged in a gear housing (14), the worm gear being drivable by the drive motor (12) and connected to the spindle (20) for conjoint rotation therewith, wherein the threads (22) engage the worm gear (15; 15a), wherein the worm gear (15; 15a) is formed from at least first and second elements (36, 38; 60, 62, 64), wherein the first element (36; 62) of the worm gear (15; 15a) has an outer toothing (17) extending along the longitudinal direction of the spindle (20), wherein the second element (38; 60, 64) of the worm gear (15) axially braces the first element (36) of the worm gear (15) against the spindle turn (22) of the spindle (20) in the longitudinal direction of the spindle (20), or the first element (62) of the worm gear (15a) is fixed between two second elements (60, 64) of the worm gear (15a), wherein the first element (36; 62) of the worm gear (15; 15a) has a geometry (44) interacting with the threads (22) of the spindle (20), in such a way that the first element (36; 62) of the worm gear (15; 15a) can be screwed onto the threads (22) of the spindle (20).

18. A spindle drive (10), the spindle drive (10) comprising a spindle (20) which is rotatable about a rotation axis (24) at least indirectly by a drive motor (12), the spindle (20) having threads (22) on which a spindle nut (26) is arranged movably in a longitudinal direction of the rotation axis (24), and with a worm gear (15; 15a) which is arranged in a gear housing (14), the worm gear being drivable by the drive motor (12) and connected to the spindle (20) for conjoint rotation therewith, wherein the threads (22) engage the worm gear (15; 15a), wherein the worm gear (15; 15a) is formed from at least first and second elements (36, 38; 60, 62, 64), wherein the first element (36; 62) of the worm gear (15; 15a) has an outer toothing (17) extending along the longitudinal direction of the spindle (20), and wherein the second element (38; 60, 64) of the worm gear (15) axially braces the first element (36) of the worm gear (15) against the spindle turn (22) of the spindle (20) in the longitudinal direction of the spindle (20), or the first element (62) of the worm gear (15a) is fixed between two second elements (60, 64) of the worm gear (15a), and wherein the second element (38; 60, 64) of the worm gear (15; 15a) has a bore (52), such that the second element (38; 60, 64) of the worm gear (15; 15a) can be pushed onto the spindle (20), in the longitudinal direction of the spindle (20), and wherein the second element (38; 60, 64) of the worm gear (15; 15a) has means for producing a clamped and/or force-fit connection to the spindle (20).

19. The spindle drive according to claim 18, wherein the means have at least one deformation portion (50).

\* \* \* \* \*